(No Model.)
W. A. PRIDGEN.
Hay and Cotton Press.
No. 230,053. Patented July 13, 1880.
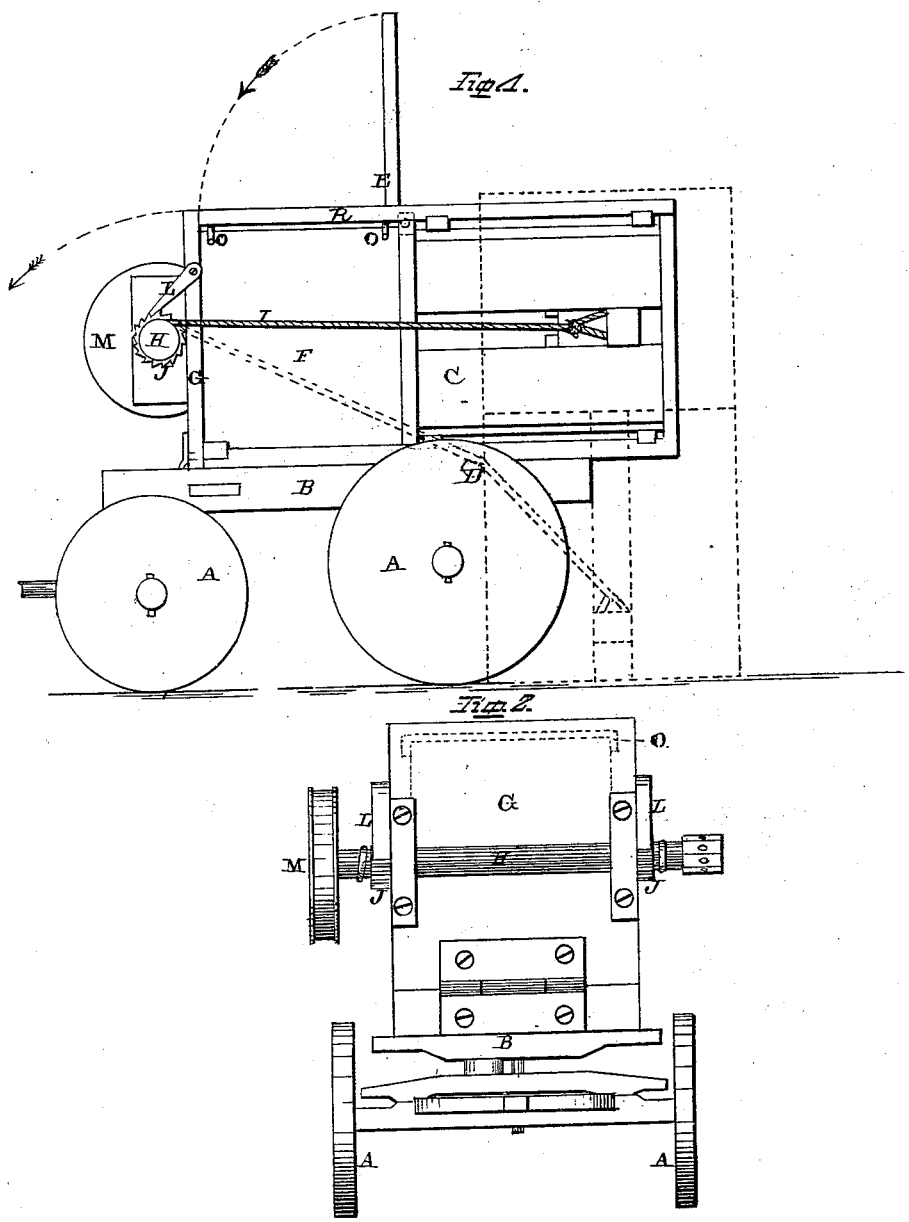

UNITED STATES PATENT OFFICE.

WILLIAM A. PRIDGEN, OF SALTILLO, MISSISSIPPI, ASSIGNOR OF ONE-HALF OF HIS RIGHT TO D. N. TANNER, OF SAME PLACE.

HAY AND COTTON PRESS.

SPECIFICATION forming part of Letters Patent No. 230,053, dated July 13, 1880.

Application filed May 31, 1880. (No model.)

*To all whom it may concern:*

Be it known that I, WILLIAM A. PRIDGEN, of Saltillo, in the county of Lee and State of Mississippi, have invented certain new and useful Improvements in Hay and Cotton Presses; and I do hereby declare the following to be a full, clear, and exact description of the invention, such as will enable others skilled in the art to which it pertains to make and use it, reference being had to the accompanying drawings, which form part of this specification.

My invention relates to an improvement in cotton and hay presses; and it consists in making the head of the press separate and distinct from the body and journaling on this head the operating-shaft for winding up the follower, whereby the body of the press can be tilted backward, leaving the head in position.

It still further consists in hinging the head of the press to the frame, so as to have the head entirely separate therefrom, and pivoting the frame or box of the press upon the wagon in such a manner that when tilted back the upper end of the press will be left uncovered, ready to be filled, while the lower end will rest solidly upon the ground, as will be more fully described hereinafter.

Figure 1 represents a side elevation of my invention, showing the press ready for use in solid lines, and the position of the press while being filled or the bale being removed in dotted lines. Fig. 2 is an end view of the press.

A represents a wagon of any suitable construction, upon which my press is placed for the purpose of transporting it from place to place where it may be most convenient to use it. Upon the top of this wagon is placed a rectangular frame, B, upon which the box or frame C is pivoted at D. By providing this box or frame with pivots, as here shown, it can be tilted backward until its end rests solidly upon the ground, for the purpose of either filling the box with hay or cotton to be compressed or removing the bale after it has been formed.

The top piece, E, of the baling-chamber is hinged or pivoted in the frame so that it can be turned backward, as shown in dotted lines, for the purpose of filling the chamber or removing the bale, and the sides F of this chamber are made removable. The front end, G, of this baling-chamber, instead of being connected directly to the frame C, as is usual in such cases, is hinged to the front end of the frame B, so as to be entirely separate and independent of the frame. After the frame has been filled and then turned back into position upon the top of the frame B this head or end piece, G, can be closed up against it, so as to close the end of the chamber while the hay, cotton, or other material is being compressed. When the chamber is tilted downward this head-piece G remains in an elevated position upon the front end of the wagon. Journaled upon this head-piece G is the shaft H, to which the ropes or chains I are fastened for the purpose of drawing the follower forward after the baling-chamber has been filled. Upon this shaft are placed two ratchets, J, with which the pawls L engage for the purpose of holding the follower in any desired position.

Upon one end of the shaft is secured a large drum, M, around which a rope may be wrapped when it is desired to apply power to the baling of the hay or cotton.

The great advantage in having this head entirely separate and distinct from the pivoted frame C consists in doing away with all trouble of removing this head after the bale has been formed or when the chamber is about to be filled. The very act of tilting the frame C leaves the upper end of the chamber open, whereby access is given to its interior either for the purpose of completing it or pulling out the bale that has been formed. The top piece, E, of this chamber is held in position by suitable rods O, which have their ends bent so as to catch over the edges of the side pieces, F, and under the beams R, which form the top of the frame. These bent rods not only hold the piece E in position, but brace and hold the upper edges of the side pieces, F, while the bale is being formed.

Having thus described my invention, I claim—

1. The combination of a tilting frame or baling-chamber, C, with a hinged head, G, the said head being entirely separate and distinct from the chamber and having secured to it a shaft, by means of which the follower is moved, substantially as shown.

2. The combination of a wagon having the frame B secured upon its top, with the baling-chamber C pivoted upon the top of the frame B, and which chamber, when tilted backward, has its lower end to rest solidly upon the ground, substantially as set forth.

In testimony that I claim the foregoing I have hereunto set my hand this 15th day of May, 1880.

W. A. PRIDGEN.

Witnesses:
A. P. McALLISTER,
G. R. CONNALLY.